United States Patent
Seo et al.

(10) Patent No.: US 11,667,765 B2
(45) Date of Patent: Jun. 6, 2023

(54) FOAM COMPOSITION AND FOAM TAPE INCLUDING FOAM LAYER INCLUDING CURED PRODUCT THEREOF

(71) Applicant: LG Chem, Ltd., Seoul (KR)

(72) Inventors: Beom Doo Seo, Daejeon (KR); Heon Sik Song, Daejeon (KR); Hyo Soon Park, Daejeon (KR); Nam Jeong Lee, Daejeon (KR); Je Sik Jung, Daejeon (KR); Hun Jeong, Daejeon (KR)

(73) Assignee: LG Chem, Ltd.

( * ) Notice: Subject to any disclaimer, the term of this patent is extended or adjusted under 35 U.S.C. 154(b) by 443 days.

(21) Appl. No.: 16/764,593

(22) PCT Filed: Nov. 16, 2018

(86) PCT No.: PCT/KR2018/014050
§ 371 (c)(1),
(2) Date: May 15, 2020

(87) PCT Pub. No.: WO2019/098727
PCT Pub. Date: May 23, 2019

(65) Prior Publication Data
US 2020/0385542 A1  Dec. 10, 2020

(30) Foreign Application Priority Data

Nov. 17, 2017 (KR) .................. 10-2017-0154106

(51) Int. Cl.
| *C08J 9/32* | (2006.01) |
| *C09J 7/38* | (2018.01) |
| *C09J 7/26* | (2018.01) |
| *C08J 9/00* | (2006.01) |
| *C09J 133/00* | (2006.01) |

(52) U.S. Cl.
CPC .............. *C08J 9/32* (2013.01); *C08J 9/0061* (2013.01); *C09J 7/26* (2018.01); *C09J 7/381* (2018.01); *C09J 133/00* (2013.01); *C08J 2203/22* (2013.01); *C08J 2207/02* (2013.01); *C08J 2323/06* (2013.01); *C08J 2353/00* (2013.01); *C08J 2451/06* (2013.01)

(58) Field of Classification Search
CPC ........ C08J 9/32; C08J 9/0061; C08J 2203/22; C08J 2207/02; C08J 2323/06; C08J 2353/00; C08J 2451/06; C09J 7/26; C09J 7/381; C09J 133/00; C09J 7/20; C09J 7/22; C09J 7/38; C08L 23/00; C08L 51/08; C08L 51/085

See application file for complete search history.

(56) References Cited

U.S. PATENT DOCUMENTS

| 5,264,278 | A | * | 11/1993 | Mazurek | .................. C09J 4/06 |
| | | | | | 428/355 R |
| 5,840,783 | A | | 11/1998 | Momchilovich et al. | |
| 6,169,138 | B1 | * | 1/2001 | Petit | .......................... C08J 9/32 |
| | | | | | 524/502 |
| 6,350,512 | B1 | | 2/2002 | Hurley et al. | |
| 6,472,015 | B1 | | 10/2002 | Hurley et al. | |
| 6,544,643 | B1 | | 4/2003 | Hyde et al. | |
| 6,841,234 | B2 | | 1/2005 | Lhila et al. | |
| 2003/0087976 | A1 | | 5/2003 | Bambara et al. | |
| 2003/0170443 | A1 | | 9/2003 | Kobe et al. | |
| 2010/0036024 | A1 | | 2/2010 | Menning | |
| 2010/0075129 | A1 | * | 3/2010 | Nagasaki | .................. C09J 5/06 |
| | | | | | 428/313.3 |
| 2011/0031435 | A1 | | 2/2011 | Yoda et al. | |
| 2011/0052911 | A1 | | 3/2011 | Hansen et al. | |
| 2014/0255681 | A1 | | 9/2014 | Epple et al. | |
| 2014/0335299 | A1 | | 11/2014 | Wang et al. | |
| 2015/0102528 | A1 | | 4/2015 | Gunes et al. | |
| 2015/0299523 | A1 | | 10/2015 | Park et al. | |
| 2016/0068715 | A1 | | 3/2016 | Kim et al. | |
| 2016/0152871 | A1 | | 6/2016 | Bieber et al. | |
| 2018/0163024 | A1 | * | 6/2018 | Gopalan | ................... C08F 8/12 |

FOREIGN PATENT DOCUMENTS

| CN | 1181778 | A | 5/1998 | |
| CN | 1466617 | A | 1/2004 | |
| CN | 101568353 | A | 10/2009 | |
| CN | 102046747 | A | 5/2011 | |
| CN | 104144997 | A | 11/2014 | |
| EP | 2995666 | A1 | 3/2016 | |
| EP | 3156466 | A1 * | 4/2017 | ............ B32B 27/08 |
| EP | 3202831 | A1 | 8/2017 | |
| JP | H1036781 | A | 2/1998 | |
| JP | 2001503813 | A | 3/2001 | |
| JP | 2004083888 | A | 3/2004 | |
| JP | 2007289357 | A | 11/2007 | |
| JP | 2008260956 | A | 10/2008 | |
| JP | 2009263542 | A | 11/2009 | |
| JP | 2011522080 | A | 7/2011 | |
| JP | 2016527367 | A | 9/2016 | |
| KR | 100914078 | B1 | 8/2009 | |
| KR | 20110019736 | A | 2/2011 | |
| KR | 20120059541 | A | 6/2012 | |
| KR | 20140133630 | A | 11/2014 | |
| KR | 20140144214 | A | 12/2014 | |

(Continued)

OTHER PUBLICATIONS

Extended European Search Report including Written Opinion for EP18879643.7 dated Oct. 27, 2020; 8 pages.

Search Report dated Jan. 25, 2022 from the Office Action for Chinese Application No. 201880073859.1 dated Feb. 18, 2022, 3 pages.

(Continued)

*Primary Examiner* — Kara B Boyle
(74) *Attorney, Agent, or Firm* — Lerner David LLP

(57) ABSTRACT

The present invention relates to a foam composition and a foam tape including a foam layer including a cured product thereof.

13 Claims, No Drawings

(56) References Cited

FOREIGN PATENT DOCUMENTS

| KR | 20150016878 A | 2/2015 |
|----|---------------|--------|
| KR | 20150126658 A | 11/2015 |

OTHER PUBLICATIONS

International Search Report from Application No. PCT/KR2018/014050 dated Mar. 4, 2019, 4 pages.

\* cited by examiner

FOAM COMPOSITION AND FOAM TAPE INCLUDING FOAM LAYER INCLUDING CURED PRODUCT THEREOF

CROSS-REFERENCE TO RELATED APPLICATIONS

The present application is a national phase entry under § 371 of International Application No. PCT/KR2018/014050 filed Nov. 16, 2018, which claims priority from Korean Patent Application No. 10-2017-0154106 filed on Nov. 17, 2017, the entire contents of which are incorporated herein by reference.

TECHNICAL FIELD

The present invention relates to a foam composition and a foam tape including a foam layer including a cured product thereof.

BACKGROUND ART

In order to manufacture a car body by coupling members for a vehicle, a method of locating and laminating a foam tape between the members has been used.

Recently, as the weight of a car body tends to be reduced, studies have been actively conducted on a foam tape capable of implementing excellent impact resistance while being able to reduce the weight of the car body through a foam tape having a foam layer having small thickness and low density.

In order to meet the recent technical trend, a method of using styrene-based rubber such as styrene-butadiene-styrene copolymer or styrene-isoprene-styrene copolymer has been emerging. However, the method has problem in that the weight reduction performance and impact resistance of the car body are slightly insufficient because styrene-based rubber having relatively high density is used.

Thus, there is a need for studies on a foam tape which is excellent in impact resistance while being able to reduce the weight of a car body.

PRIOR ART DOCUMENT

Patent Document

Korean Patent Application Laid-Open No. 10-2014-0133630

DETAILED DESCRIPTION OF INVENTION

Technical Problem

The present invention has been made in an effort to provide a foam composition and a foam tape including a foam layer including a cured product thereof.

However, a problem to be solved by the present invention is not limited to the aforementioned problem, and other problems that are not mentioned may be clearly understood by a person skilled in the art from the following description.

Technical Solution

An exemplary embodiment of the present invention provides a foam composition including: olefin resin having a density of 0.7 $g/cm^3$ to 0.9 $g/cm^3$, a glass transition temperature of −30° C. or less, and a melting point of 50° C. to 125° C.; and a hollow microsphere.

Another exemplary embodiment of the present invention provides a foam tape including a foam layer including a cured product of the foam composition.

Advantageous Effects

A foam tape according to an exemplary embodiment of the present invention is excellent in cold resistance.

The foam tape according to an exemplary embodiment of the present invention is excellent in durability.

When the foam tape according to an exemplary embodiment of the present invention is used for bonding members for an automobile, it is possible to implement reduction of the weight of an automotive car body.

BEST MODE

When one part "includes" one constituent element in the present specification, unless otherwise specifically described, this does not mean that another constituent element is excluded, but means that another constituent element may be further included.

In the present specification, the term "monomer polymerization unit" may mean a form in which the monomer forms a skeleton of the polymer, for example, a main chain or a side chain by being subjected to a polymerization reaction.

In the present specification, the unit "part by weight" may mean a weight ratio between the respective components.

In the present specification, the term "(meth)acrylate" may mean acrylate or methacrylate.

In the present specification, the term "monomer" may mean a unit body for forming polymer, and may mean prepolymer consisting of the same repeating unit.

In the present specification, the thickness of any member may be measured by measuring the cross section of the corresponding member by means of a thickness gauge.

In the present specification, the term "alkyl group" may mean those including a carbon chain structure in which an unsaturated bond is not present in a functional group, and may mean those including a straight-chained or branched carbon chain structure having 1 to 20 carbon atoms.

In the present specification, the term "cycloalkyl group" may mean those including a carbon ring structure in which an unsaturated bond is not present in a functional group, and may mean those including a monocyclic ring or polycyclic ring having 2 to 20 carbon atoms.

In the present specification, the term "glass transition temperature (Tg)" may be a value determined as a middle point of DSC curve by heating the corresponding test specimen at a heating rate of 10° C./min within a temperature range of −70° C. to 150° C. using a differential scanning calorimeter (DSC, Q-1000, TA Instrument) and measuring the temperature.

In the present specification, the term "weight average molecular weight" may be measured as a value converted into polystyrene as determined by gel permeation chromatography (GPC).

The present inventors confirmed that there is a problem in the case of manufacturing a foam tape including a styrene-based rubber consisting of styrene-based block copolymer such as styrene-butadiene-styrene or styrene-isoprene-styrene in a foam layer as in the method in the related art. Specifically, the present inventors confirmed that the method in the related art is not suitable for the reduction in weight of a car body when a foam tape is applied to members for an automobile due to high density characteristics of the styrene-based rubber. As a result of assiduous efforts to alleviate the problem, the present inventors have completed the present invention.

Specifically, the present inventors confirmed that when a foam tape is prepared by using a low-density olefin resin instead of styrene-based rubber, the foam tape is excellent in durability and has high adhesive strength and tensile strength, and the weight of a car body can be reduced, thereby completing the present invention.

Hereinafter, the present specification will be described in more detail.

An exemplary embodiment of the present invention provides a foam composition including: olefin resin having a density of 0.7 $g/cm^3$ to 0.9 $g/cm^3$, a glass transition temperature of −30° C. or less, and a melting point of 50° C. to 125° C.; and a hollow microsphere.

A foam composition according to an exemplary embodiment of the present invention may include the olefin resin, specifically, olefin resin having a density and a glass transition temperature within the above ranges, thereby securing durability of a foam tape including a foam layer prepared by using the olefin resin and simultaneously implementing the reduction of the weight of a member to be adhered.

Further, the foam composition may include the olefin resin, thereby providing a foam tape having high adhesive strength and tensile strength due to excellent physical and chemical bonding strengths with acrylic copolymer included in an adhesive layer of a foam tape as described below.

In the present specification, the olefin resin may be olefin resin in which the double bond of olefin unit body including a double bond may be converted into a single bond and included in a polymerization unit to form a chain.

According to an exemplary embodiment of the present invention, the olefin resin may have a density of 0.7 $g/cm^3$ to 0.9 $g/cm^3$, 0.7 $g/cm^3$ to 0.85 $g/cm^3$, 0.8 $g/cm^3$ to 0.9 $g/cm^3$, 0.85 $g/cm^3$ to 0.9 $g/cm^3$, or 0.87 $g/cm^3$ to 0.89 $g/cm^3$.

In addition, the density of the olefin resin may mean the mass of olefin resin with respect to the volume thereof, and may be measured in accordance with ASTM D1505 standard.

A foam tape including a foam layer prepared by using a foam composition including olefin resin within the density range may implement the reduction in weight of a car body when applied to members for an automobile.

Specifically, when the density of the olefin resin is less than the above range, the durability of the foam tape deteriorates, so that there may occur a problem in that the strength of the foam tape is reduced, and when the density of the olefin resin is more than the above range, there may occur a problem in that a sufficient adhesive strength of the foam tape cannot be secured.

According to an exemplary embodiment of the present invention, the olefin resin may have a glass transition temperature of −30° C. or less, specifically, −100° C. to −30° C., −100° C. to −40° C., −100° C. to −50° C., −70° C. to −30° C., −70° C. to −40° C., −70° C. to −50° C., −60° C. to −30° C., −60° C. to −40° C., −55° C. to −45° C., or −60° C. to −50° C.

A foam layer prepared by using a foam composition including olefin resin within the above glass transition temperature range may implement soft physical properties and may improve the bendability of the foam tape.

Specifically, when the temperature range of the olefin resin is less than the glass transition temperature range, there may occur a problem with punchability of a foam tape to be described below, and when the temperature range of the olefin resin is more than the glass transition temperature range, soft physical properties of the foam layer are not implemented, so that it may be difficult to implement the reduction of the weight of a member to be adhered.

According to an exemplary embodiment of the present invention, the olefin resin may have a melting point (Tm) of 50° C. to 125° C., 50° C. to 100° C., 50° C. to 91° C., 50° C. to 80° C., 50° C. to 70° C., 55° C. to 125° C., 55° C. to 100° C., 55° C. to 80° C., or 55° C. to 70° C.

Within the above melting point range of the olefin resin, it is possible to provide a foam tape having high tensile strength and adhesive strength while being excellent in heat resistance. Specifically, within the above melting point range of the olefin resin, there are advantages in that it is possible to minimize damage caused by heat of the foam tape, and it is possible to allow the foam tape to be easily attached even to various members having a form such as a curved surface.

According to an exemplary embodiment of the present invention, the foam composition includes a hollow microsphere.

The foam composition may include a hollow microsphere, thereby forming bubbles in a foam layer included in a foam tape when the foam composition is cured, and accordingly, it is possible to impart flexibility and impact resistance to the foam tape.

According to an exemplary embodiment of the present invention, the hollow microsphere may be a hollow polymer microsphere.

In the present specification, the term "hollow" means a form in which the inside thereof is empty, and the term "microsphere" may mean micro-sized spherical particles. In this case, 'spherical' does not mean a shape of a geometrically perfect sphere, and may mean a shape typically recognized as a shape of a sphere. Further, the form in which the inside thereof is empty means that a liquid or solid component is not included, and a gas component that is not visually perceived may be included.

In addition, since the hollow polymer microsphere is a low-density polymer composition and has a low specific weight, there are advantages in that it is possible to reduce the weight, the processing is easy, and production costs may be reduced because the hollow polymer microsphere is introduced in a relatively small content.

According to an exemplary embodiment of the present invention, the hollow microsphere may have a particle size of 30 μm to 200 μm, 30 μm to 85 μm, 55 μm to 200 μm, or 55 μm to 85 μm.

Within the particle size range of the hollow microsphere, the hollow microsphere may be appropriately dispersed in the foam composition, and may implement the impact resistance and flexibility of a foam layer including a cured product of the foam composition.

In the present specification, the particle size of the hollow microsphere may mean a particle diameter of a hollow microsphere measured according to the standard suggested by the Technical Bulletin No. 8b provided by AkzoNobel Co., Ltd.

According to an exemplary embodiment of the present invention, the hollow microsphere may have a density of 0.01 $g/cm^3$ to 0.05 $g/cm^3$, 0.01 $g/cm^3$ to 0.04 $g/cm^3$, 0.03 $g/cm^3$ to 0.05 $g/cm^3$, or 0.03 $g/cm^3$ to 0.04 $g/cm^3$.

When a hollow microsphere within the above density range is included, the foam composition may prevent the hollow microsphere from being scattered, and may allow the hollow microsphere to be appropriately dispersed in the foam layer.

In the present specification, the density of the hollow microsphere may mean a mass per unit volume of a hollow microsphere measured according to the standard suggested by the Technical Bulletin No. 26 provided by AkzoNobel Co., Ltd.

According to an exemplary embodiment of the present invention, a content of the hollow microsphere may be 1 part by weight to 10 parts by weight, 1 part by weight to 5 parts by weight, 2 parts by weight to 10 parts by weight, or 2 parts by weight to 5 parts by weight with respect to 100 parts by weight of the olefin resin.

When a hollow microsphere within the above content range is included, the foam composition may be prepared into a foam layer that is easily shrunk and has high durability. Specifically, when a hollow microsphere within the above content range is included, the foam layer may be laminated with an adhesive layer as described below with high bonding strength because the hollow microsphere may be uniformly dispersed in the foam composition.

According to an exemplary embodiment of the present invention, the olefin resin may include at least one of non-modified polyolefin and silane-modified polyolefin.

Specifically, when the olefin resin includes silane-modified polyolefin, the foam composition may be chemically bonded to acrylic copolymer in an adhesive composition to be described below to prevent the separation of a foam layer and an adhesive layer of a foam tape, and a cross-linking bond in the foam composition may be promoted by the acrylic copolymer.

Further, when the olefin resin includes the non-modified polyolefin, the foam composition may be chemically bonded to acrylic copolymer in an adhesive composition to be described below to prevent the separation of a foam layer and an adhesive layer of a foam tape while the foam composition is cured, and a cross-linking bond between components in the foam layer may be promoted while the foam composition is cured.

Specifically, when the olefin resin includes the non-modified polyolefin, the foam composition may be chemically bonded to acrylic copolymer in an adhesive composition to be described below while the foam composition is cured by irradiation of electron beam, and a cross-linking bond between components in the foam layer may be promoted while the foam composition is cured by irradiation of an electron beam.

According to an exemplary embodiment of the present invention, the non-modified polyolefin may mean that a separate functional group other than olefin unit body is not bonded during the polymerization of the olefin unit body.

In addition, the silane-modified polyolefin may mean silane-modified polyolefin in which when olefin unit body is polymerized into polyolefin, functional group including silane is bonded, or functional group including silane is substituted in or added to the polymerized polyolefin.

According to an exemplary embodiment of the present invention, the silane-modified polyolefin may be silane-modified polyolefin in which a polymerization unit derived from unsaturated silane compound is graft-polymerized with the non-modified polyolefin.

Specifically, the silane-modified polyolefin may mean silane-modified polyolefin in which a polymerization unit derived from the unsaturated silane compound is graft-polymerized with a main chain at one side of olefin polymerization unit included in the non-modified polyolefin. That is, the silane-modified polyolefin may include olefin polymerization unit modified into a polymerization unit derived from unsaturated silane compound.

That is, the modified polyolefin may be modified polyolefin in which carbon radicals at one side of olefin polymerization unit included in the non-modified polyolefin may be chemically bonded to silicon radicals derived from the unsaturated silane compound, and specifically, are radically bonded.

According to an exemplary embodiment of the present invention, the silane-modified polyolefin may be silane-modified polyolefin prepared by reacting non-modified polyolefin and unsaturated silane compound with radical initiator. Specifically, the silane-modified polyolefin may be silane-modified polyolefin prepared by using silane-modified composition including the non-modified polyolefin, the unsaturated silane compound, and the radical initiator. More specifically, the silane-modified polyolefin may be silane-modified polyolefin prepared by reacting and extruding the silane-modified composition.

That is, the silane-modified polyolefin may be silane-modified polyolefin obtained by creating a high temperature and high pressure atmosphere in the silane-modified composition to induce a reaction in the silane-modified composition and extruding the silane-modified composition prepared through the reaction.

According to an exemplary embodiment of the present invention, the silane-modified polyolefin may be separately prepared by reacting and extruding separate silane-modified composition as described above and introduced into the foam composition.

Furthermore, the silane-modified polyolefin may be prepared by introducing unsaturated silane compound and radical initiator into a foam composition including the non-modified polyolefin and reacting the unsaturated silane compound and the radical initiator with the foam composition, and may be specifically prepared by reacting and extruding the unsaturated silane compound, the radical initiator, and the foam composition.

According to an exemplary embodiment of the present invention, the radical initiator may induce each of the non-modified polyolefin and the unsaturated silane compound to form radicals, and the non-modified polyolefin and the unsaturated silane compound in which radicals are formed may be chemically bonded to each other to prepare the silane-modified polyolefin.

According to an exemplary embodiment of the present invention, the unsaturated silane compound may include at least one of vinyltrimethoxy silane, vinyltriethoxy silane, vinyltripropoxy silane, vinyltriisopropoxy silane, vinyltributoxy silane, vinyltripentoxy silane, vinyltriphenoxy silane, and vinyltriacetoxy silane. However, the unsaturated silane compound is not limited thereto, and may be used without limitation as long as the unsaturated silane compound is a compound that may induce the silane modification of the non-modified polyolefin and includes silane.

According to an exemplary embodiment of the present invention, the radical initiator may include at least one of t-butylcumylperoxide, di-t-butylperoxide, di-cumylperoxide, 2,5-dimethyl-2,5-di(t-butylperoxy)hexane, 2,5-dimethyl-2,5-di(t-peroxy)hexane, cumene hydroperoxide, diisopropyl benzene hydroperoxide, 2,5-dimethyl-2,5-di(hydroperoxy)hexane, t-butyl hydroperoxide, bis-3,5,5-trimethylhexanoyl peroxide, octanoyl peroxide, benzoyl peroxide, o-methylbenzoyl peroxide, 2,4-dichlorobenzoyl peroxide, t-butylperoxy isobutylate, t-butylperoxy acetate, t-butylperoxy-2-ethylhexanoate, t-butylperoxy pivalate, t-butylperoxy octoate, t-butylperoxyisopropyl carbonate, t-butylperoxy benzoate, di-t-butylperoxy phthalate, 2,5-dimethyl-2,5-di(benzoylperoxy)hexane, 2,5-dimethyl-2,5-di(benzoylperoxy)hexyne, methyl ethyl ketone peroxide, cyclohexanone peroxide, lauroyl peroxide, azobisisobutyronitrile, and azobis(2,4-dimethylvaleronitrile). However, the radical initiator is not limited thereto, and may be selected freely among radical initiators known in the art as long as the radical initiator may form radicals in the non-modified polyolefin and the unsaturated silane compound.

According to an exemplary embodiment of the present invention, a content of the unsaturated silane compound may be 1 part by weight to 10 parts by weight, 1 part by weight to 6 parts by weight, 2 parts by weight to 10 parts by weight, or 2 parts by weight to 6 parts by weight with respect to 100 parts by weight of the non-modified polyolefin.

Meanwhile, the content of the unsaturated silane compound may mean a content with respect to the silane-modified composition when the silane-modified polyolefin is prepared by reacting and extruding separate silane-modified composition.

Further, the content of the unsaturated silane compound may mean a content with respect to the foam composition when the silane-modified polyolefin is prepared by introducing unsaturated silane compound and a radical initiator into a foam composition including the non-modified polyolefin and reacting the unsaturated silane compound and the radical initiator with the foam composition.

Within the above content range of the unsaturated silane compound, a bonding strength with the adhesive layer may be improved by sufficiently securing compatibility with acrylic copolymer in an adhesive layer of silane-modified polyolefin included in a foam composition. In addition, within the above content range of the unsaturated silane compound, the durability of the foam layer may be secured by allowing the non-modified polyolefin to be sufficiently modified.

According to an exemplary embodiment of the present invention, a content of the radical initiator may be 0.01 part by weight to 1 part by weight, 0.01 part by weight to 0.2 part by weight, 0.02 part by weight to 1 part by weight, or 0.02 part by weight to 0.2 part by weight with respect to 100 parts by weight of the non-modified polyolefin.

Meanwhile, the content of the radical initiator may mean a content with respect to the silane-modified composition when the silane-modified polyolefin is prepared by reacting and extruding separate silane-modified composition.

Furthermore, the content of the radical initiator may mean a content with respect to the foam composition when the silane-modified polyolefin is prepared by introducing unsaturated silane compound and radical initiator into a foam composition including the non-modified polyolefin and reacting the unsaturated silane compound and the radical initiator with the foam composition.

Within the above content range of the radical initiator, a polymerization unit that may be bonded to the non-modified polyolefin, specifically, a polymerization unit derived from the unsaturated silane compound is sufficiently produced, so that the non-modified polyolefin may be sufficiently modified with the unsaturated silane compound, and the chemical stability of the silane-modified polyolefin may be secured.

According to an exemplary embodiment of the present invention, the non-modified polyolefin may include at least one of ultra-low density polyethylene (ULDPE), low density polyethylene (LDPE), linear low density polyethylene (LLDPE), metallocene polyethylene, olefin block copolymer, and polyolefin-based elastomer.

Specifically, the non-modified polyolefin may include at least one of LC 168, LC 175, LC 565, LC 875, LC 100, LC 160, LC 161, LC 170, LC 180, LC 670, LC 180, and LF 100 (all manufactured by LG Chem) which are trade names of a registered trademark LUCENE. However, the non-modified polyolefin is not always limited thereto, and may include a low density polyolefin elastomer commercially available by manufacturers generally known in the art, such as Mitsui Chemicals, Inc. and The Dow Chemical Company.

In the present specification, ultra-low density polyethylene may mean polyethylene having a density of about 0.86 $g/cm^3$ to 0.915 $g/cm^3$ as measured in accordance with ASTM D792 standard, and low density polyethylene may mean polyethylene having a density of about 0.916 $g/cm^3$ to 0.935 $g/cm^3$ as measured in accordance with ASTM D792 standard.

Further, in the present specification, the term "elastomer" may mean polymer having a property of being stretched by applying external force and returning to the original length when the external force is removed.

According to an exemplary embodiment of the present invention, the foam composition may further include a colorant. By including the colorant, it is possible to appropriately adjust the color of a multilayer adhesive tape including a foam layer prepared by using the foam composition according to characteristics of a finally manufactured article.

According to an exemplary embodiment of the present invention, in the colorant, one or more pigments, dyes, or a mixture thereof may be used.

According to an exemplary embodiment of the present invention, the colorant may include one or more selected from the group consisting of carbon black, iron oxide, titanium oxide, chromium oxide, and aniline black as a black pigment. In addition, the colorant may be azo-based dye, anthraquinone-based dye, azo-based metal complex dye, a chromium-based dye, indigo-based dye, or azoic dye as organic dye. Furthermore, the colorant may be azo-based pigment, phthalocyanine-based pigment, lake-based pigment, thioindigo-based pigment, perinone-based pigment, quinacridone-based pigment, or quinophthalone-based pigment as organic pigment.

According to an exemplary embodiment of the present invention, the colorant may be Carmine 6B (C.I. 12490), Phthalocyanine Green (C.I. 74260), Phthalocyanine Blue (C.I. 74160), Perylene Black (BASF K0084 and K0086), Cyanine Black, Lionol Yellow (C.I. 21090), Lionol Yellow GRO (C.I. 21090), Benzidine Yellow 41-564D, Victoria Pure Blue (C.I.42595), C.I. PIGMENT RED 3, 23, 97, 108, 122, 139, 140, 141, 142, 143, 144, 149, 166, 168, 175, 177, 180, 185, 189, 190, 192, 202, 214, 215, 220, 221, 224, 230, 235, 242, 254, 255, 260, 262, 264 and 272; C.I. PIGMENT GREEN 7, 36, and 58; C.I. PIGMENT BLUE 15:1, 15:3, 15:4, 15:6, 16, 22, 28, 36, 60 and 64; C.I. PIGMENT YELLOW 13, 14, 35, 53, 83, 93, 95, 110, 120, 138, 139, 150, 151, 154, 175, 180, 181, 185, 194 and 213; or C.I. PIGMENT VIOLET 15, 19, 23, 29, 32 and 37. Specifically, the colorant may be phthalocyanine-based complex compound having copper as central metal or phthalocyanine-based complex compound having zinc as central metal. However, the colorant is not limited thereto, and as the colorant, typical pigment or dye may be used.

Another exemplary embodiment of the present invention provides a foam tape.

Specifically, an exemplary embodiment of the present invention provides a foam tape including a foam layer including a cured product of the foam composition.

According to an exemplary embodiment of the present invention, the foam layer may include a cured product of the foam composition.

According to an exemplary embodiment of the present invention, the foam layer may be prepared by using the foam composition, and specifically, the foam layer may be prepared by curing the foam composition. More specifically, the foam layer may be prepared by extruding the foam composition to process the foam composition in a form of a film, and then curing the processed foam composition.

According to an exemplary embodiment of the present invention, the foam layer may be prepared by mixing the foam composition in extruder, specifically, a twin extruder, extruding the foam composition to process the foam composition in a form of a film, and then curing the processed foam composition. In this case, the polyolefin resin and the hollow microsphere included in the foam layer may be smoothly mixed, and accordingly, the hollow microsphere may be appropriately dispersed in the foam layer.

According to an exemplary embodiment of the present invention, the foam tape may enhance the durability thereof by including the foam layer, and when the foam tape is applied to members for an automobile, the reduction in weight of the car body may be implemented.

According to an exemplary embodiment of the present invention, the cured product of the foam composition may include silane-crosslinked polyolefin.

According to an exemplary embodiment of the present invention, the silane-crosslinked polyolefin may be silane-crosslinked polyolefin in which one silane-modified polyolefin is crosslinked with another silane-modified polyolefin. Specifically, the silane-crosslinked polyolefin may be silane-crosslinked polyolefin in which silicon in polymerization unit of one silane-modified polyolefin is chemically bonded to silicon in polymerization unit of another silane-modified polyolefin, and specifically, are radically bonded to the silicon.

According to an exemplary embodiment of the present invention, the foam layer may have a density of 0.2 $g/cm^3$ to 0.9 $g/cm^3$, 0.2 $g/cm^3$ to 0.8 $g/cm^3$, 0.3 $g/cm^3$ to 0.9 $g/cm^3$, or 0.3 $g/cm^3$ to 0.8 $g/cm^3$.

Within the density range of the foam layer, within the density range of the foam layer of the foam tape, soft physical properties of the foam tape may be implemented, the impact resistance may be secured, and a member to which the foam tape is attached may be allowed to reduce the weight thereof.

In the present specification, the density of the foam layer may be measured by a density measurement method generally known in the art.

According to an exemplary embodiment of the present invention, the foam tape may further include an adhesive layer provided on at least one surface of the foam layer. That is, the foam tape may further include an adhesive layer, and the adhesive layer may be provided on at least one surface of the foam layer.

According to an exemplary embodiment of the present invention, the foam tape may have a density of 0.2 $g/cm^3$ to 0.9 $g/cm^3$, 0.2 $g/cm^3$ to 0.8 $g/cm^3$, 0.3 $g/cm^3$ to 0.9 $g/cm^3$, or 0.3 $g/cm^3$ to 0.8 $g/cm^3$. When the density of the foam tape is within the above range, soft physical properties of the foam tape may be implemented, the impact resistance may be secured, and a member to which the foam tape is attached may be allowed to reduce the weight thereof.

In the present specification, the density of the foam tape may be measured by a density measurement method generally known in the art.

According to an exemplary embodiment of the present invention, the adhesive layer may include cured product of an adhesive composition including acrylic copolymer and olefin resin.

According to an exemplary embodiment of the present invention, the adhesive layer may be prepared by curing the adhesive composition. Specifically, the adhesive layer may be prepared by extruding the adhesive composition to process the adhesive composition in a form of a film, and then curing the processed adhesive composition.

According to an exemplary embodiment of the present invention, the adhesive layer may be prepared by mixing the adhesive composition in extruder, specifically, a twin extruder, extruding the adhesive composition to process the adhesive composition in a form of a film, and then curing the processed adhesive composition. In this case, the acrylic copolymer and the olefin resin included in the adhesive composition may be smoothly mixed.

According to an exemplary embodiment of the present invention, the olefin resin of the adhesive layer may be the same as the above-described olefin resin.

According to an exemplary embodiment of the present invention, the acrylic copolymer means hot-melt acrylic resin generally known in the art. That is, when the acrylic copolymer is heated, the acrylic copolymer is melted, and may be appropriately dispersed in the composition including the acrylic copolymer.

According to an exemplary embodiment of the present invention, the acrylic copolymer may include at least one of alkyl group-containing (meth)acrylate monomer polymerization unit, cycloalkyl group-containing (meth)acrylate monomer polymerization unit, and polar functional group-containing monomer polymerization unit.

In addition, the acrylic copolymer may be prepared by polymerizing at least one of alkyl group-containing (meth)acrylate monomer, cycloalkyl group-containing (meth)acrylate monomer, and polar functional group-containing monomer.

According to an exemplary embodiment of the present invention, the alkyl group-containing (meth)acrylate monomer may be alkyl group-containing (meth)acrylate monomer in which the above-described alkyl group is bonded to (meth)acrylate monomer.

According to exemplary embodiment of the present invention, the alkyl group-containing (meth)acrylate monomer may include at least one of methyl(meth)acrylate, ethyl(meth)acrylate, n-propyl(meth)acrylate, isopropyl (meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl (meth)acrylate, and isooctyl(meth)acrylate.

According to an exemplary embodiment of the present invention, the cycloalkyl group-containing (meth)acrylate monomer may be cycloalkyl group-containing (meth)acrylate monomer in which the above-described cycloalkyl group is bonded to (meth)acrylate monomer.

According to an exemplary embodiment of the present invention, the cycloalkyl group-containing (meth)acrylate monomer may include at least one of cyclohexyl acrylate (CHA), cyclohexyl methacrylate (CHMA), isobornyl acrylate (IBOA), isobornyl methacrylate (IBOMA), isobornyl methyl (meth)acrylate, and 3,3,5-trimethylcyclohexylacrylate (TMCHA).

According to an exemplary embodiment of the present invention, the polar functional group-containing monomer may be monomer to which polar functional group is bonded.

According to an exemplary embodiment of the present invention, the polar functional group-containing monomer may include at least one of hydroxyl group-containing monomer, carboxyl group-containing monomer, and nitrogen-containing monomer.

According to an exemplary embodiment of the present invention, the hydroxyl group-containing monomer may include at least one of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, ethylene glycol (meth)acrylate, and propylene glycol (meth)acrylate.

According to an exemplary embodiment of the present invention, the carboxyl group-containing monomer may include at least one of acrylic acid, methacrylic acid, 2-carboxyethyl acrylic acid, 3-carboxypropyl acrylic acid, 2-(meth)acryloyloxy acetic acid, 3-(meth)acryloyloxy propyl acid, 4-(meth)acryloyloxy butyl acid, and acrylic acid dimer.

According to an exemplary embodiment of the present invention, the nitrogen-containing monomer may include at least one of 2-isocyanatoethyl (meth)acrylate, 3-isocyanatopropyl (meth)acrylate, 4-isocyanatobutyl (meth)acrylate, and (meth)acrylamide.

According to an exemplary embodiment of the present invention, the acrylic copolymer may have a glass transition temperature of −90° C. to −20° C., −90° C. to −30° C., −80° C. to −20° C., or −80° C. to −30° C.

Within the glass transition temperature range of the acrylic copolymer, soft physical properties of an adhesive layer prepared by using the adhesive composition may be secured, a chemical bond between the adhesive layer and the foam layer may be promoted, and the peeling of the foam layer and the adhesive layer may be effectively prevented.

According to an exemplary embodiment of the present invention, the acrylic copolymer may have a weight average molecular weight of 50,000 g/mol to 700,000 g/mol, 50,000 g/mol to 600,000 g/mol, 100,000 g/mol to 700,000 g/mol, or 100,000 g/mol to 600,000 g/mol.

Within the weight average molecular weight range of the acrylic copolymer, an adhesive layer prepared by using the adhesive composition may be efficiently laminated with the foam layer, and the foam tape including the adhesive layer may be attached to a member to be adhered with excellent bonding strength.

According to an exemplary embodiment of the present invention, a content of the olefin resin included in the adhesive composition may be 10 parts by weight to 60 parts by weight, 10 parts by weight to 50 parts by weight, 10 parts by weight to 45 parts by weight, 35 part by weight to 60 parts by weight, 35 parts by weight to 50 parts by weight, 35 parts by weight to 45 parts by weight, 40 parts by weight to 60 parts by weight, 40 parts by weight to 50 parts by weight, or 40 parts by weight to 45 parts by weight, with respect to 100 parts by weight of the acrylic copolymer.

In an adhesive composition including olefin resin within the above content range, it is possible to simultaneously implement high adhesive strength and low density characteristics of a foam tape including an adhesive layer prepared by using the adhesive composition.

According to an exemplary embodiment of the present invention, the adhesive composition may further include tackifier. The adhesive composition may further include tackifier, thereby improving adhesive strength with respect to the foam layer of the adhesive layer and/or the member to be adhered.

Further, the type of tackifier is not particularly limited, and may be one or more selected from general rosin-based, terphene-based, hydrocarbon-based, phenol-based, and ketone-based tackifiers known in the art.

According to an exemplary embodiment of the present invention, a content of the tackifier included in the adhesive composition may be 5 parts by weight to 40 parts by weight, 5 parts by weight to 20 parts by weight, 5 parts by weight to 15 parts by weight, 7 parts by weight to 40 parts by weight, 7 parts by weight to 20 parts by weight, 7 parts by weight to 15 parts by weight, 9 parts by weight to 40 parts by weight, 9 parts by weight to 20 parts by weight, or 9 parts by weight to 15 parts by weight, with respect to 100 parts by weight of a total of the acrylic copolymer and the olefin resin.

An adhesive composition further including tackifier within the above range may maximize an effect of improving adhesive strength of a foam tape including an adhesive layer prepared by using the adhesive composition.

Specifically, within the above content range of the tackifier, the adhesive layer may be sufficiently bonded to the foam layer, thereby securing the durability of the foam tape and securing the durability of the adhesive layer.

According to an exemplary embodiment of the present invention, the foam tape may be prepared by processing the adhesive composition and the foam composition in the form of a film, respectively, and then laminating the films.

Specifically, the foam tape may be prepared by extruding each of an adhesive composition and a foam composition using separate extruder to process the adhesive composition and the foam composition in the form of a film, respectively, sequentially stacking the films, and then compressing and laminating the films, and curing the films by irradiation of electron beam.

According to an exemplary embodiment of the present invention, the electron beam may have a dose of 40 kGy to 100 kGy, 40 kGy to 100 kGy, 50 kGy to 100 kGy, or 50 kGy to 60 kGy.

According to an exemplary embodiment of the present invention, a thickness ratio of the adhesive layer to the foam layer may be 1:1 to 1:10 or 1:2 to 1:5.

Within the above thickness ratio range of the adhesive layer to the foam layer, high adhesive strength of a multilayer adhesive tape may be secured, and simultaneously, weight reduction characteristics may be implemented.

According to an exemplary embodiment of the present invention, the foam layer may have a thickness of 0.2 mm to 5 mm, 0.2 mm to 3 mm, 0.2 mm to 1.5 mm, 0.5 mm to 5 mm, 0.5 mm to 3 mm, 0.5 mm to 1.5 mm, 0.7 mm to 5 mm, 0.7 mm to 3 mm, or 0.7 mm to 1.5 mm.

According to an exemplary embodiment of the present invention, the adhesive layer may have a thickness of 0.02 mm to 0.5 mm, 0.02 mm to 0.3 mm, 0.02 mm to 0.15 mm, 0.05 mm to 0.5 mm, 0.05 mm to 0.3 mm, 0.05 mm to 0.15 mm, 0.07 mm to 0.5 mm, 0.07 mm to 0.3 mm, or 0.07 mm to 0.15 mm.

Furthermore, the thickness of the adhesive layer may be appropriately adjusted so as to exhibit the thickness ratio according to the thickness of the foam layer.

According to an exemplary embodiment of the present invention, the adhesive composition and/or the foam composition may be solvent-free. That is, the adhesive composition and/or the foam composition may not include separate solvent.

According to an exemplary embodiment of the present invention, since the adhesive composition and/or the foam composition is introduced into separate extruder and mixed, the adhesive composition and/or the foam composition may be smoothly mixed without any separate solvent to form a foam layer and an adhesive layer, respectively.

According to an exemplary embodiment of the present invention, the adhesive layer and the foam layer may be chemically bonded to each other.

Specifically, when the foam composition includes non-modified polyolefin, the non-modified polyolefin included in the foam composition through the curing by irradiation of electron beam and the acrylic copolymer included in the adhesive composition may be chemically bonded to each other.

According to an exemplary embodiment of the present invention, when the foam composition includes silane-modified polyolefin, the silane-modified polyolefin included in the foam composition and the acrylic copolymer included in the adhesive composition may be chemically bonded to each other, and specifically, may be bonded to each other through silane condensation reaction.

In this case, the adhesive layer and the foam layer do not always require irradiation of electron beam to be chemically bonded to each other, and can be chemically bonded to each other without separate irradiation of electron beam.

MODE FOR INVENTION

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to the person with ordinary skill in the art.

[Preparation Example 1]—Preparation of Silane-Modified Polyolefin

A silane-modified polyolefin was prepared by reacting and extruding about 4 parts by weight of vinyltrimethoxy silane (VTMS) and about 0.1 part by weight of peroxide-based radical initiator with respect to 100 parts by weight of polyolefin elastomer having a density of 0.87 $g/cm^3$, a glass transition temperature of about −55° C., and a melting point of about 50° C. The silane-modified polyolefin according to Preparation Example 1 had a density, a glass transition temperature, and a melting point of 0.88 $g/cm^3$, about −54° C., and about 51° C., respectively.

[Preparation Example 2]—Preparation of Silane-Modified Polyolefin

A silane-modified polyolefin was prepared in the same manner as in Preparation Example 1, except that polyolefin elastomer having a density of 0.89 $g/cm^3$, a glass transition temperature of about −45° C., and a melting point of about 91° C. was used instead of the polyolefin elastomer used in Preparation Example 1. The silane-modified polyolefin according to Preparation Example 2 had a density, a glass transition temperature, and a melting point of 0.90 $g/cm^3$, about −46° C., and about 92° C., respectively.

[Preparation Example 3]—Preparation of Silane-Modified Polyolefin

A silane-modified polyolefin was prepared in the same manner as in Preparation Example 1, except that linear polyethylene having a density of 0.93 $g/cm^3$, a glass transition temperature of about −25° C., and a melting point of about 130° C. was used instead of the polyolefin elastomer used in Preparation Example 1. The silane-modified polyolefin according to Preparation Example 3 had a density, a glass transition temperature, and a melting point of 0.94 $g/cm^3$, about −47° C., and about 93° C., respectively.

[Example 1]—Preparation of Foam Tape

A foam composition including about 4.5 parts by weight of hollow microsphere (Expancel 950 DE 120, AkzoNobel Co., Ltd.) with respect to 100 parts by weight of the silane-modified polyolefin according to Preparation Example 1 was prepared.

Furthermore, an adhesive composition including acrylic copolymer in which 2-ethylhexyl acrylate and acrylic acid were copolymerized as acrylic resin, the polyolefin elastomer used in Preparation Example 1 as polyolefin resin, and tackifier (regalite s1000, Eastman Chemical Company) was prepared.

A content of the polyolefin resin included in the adhesive composition was about 42.85 parts by weight with respect to 100 parts by weight of the acrylic copolymer, and a content of the tackifier was about 10 parts by weight with respect to 100 parts by weight of a total of the acrylic copolymer and the olefin resin.

An adhesive layer in the form of a film was formed by reacting and extruding the adhesive composition to a thickness of about 0.1 mm using twin extruder, and a foam layer in the form of a film was formed by reacting and extruding the foam composition to a thickness of about 1 mm using the twin extruder.

By compressing the adhesive layer and the foam layer, a foam tape having a density of about 0.5 $g/cm^3$ in which the adhesive layer, the foam layer, and the adhesive layer were sequentially provided was prepared.

[Example 2]—Preparation of Foam Tape

An adhesive layer in the form of a film and a foam layer in the form of a film were formed in the same manner as in Example 1, except that during the preparation of an adhesive composition, the silane-modified polyolefin according to Preparation Example 1 was used instead of the polyolefin elastomer used in Preparation Example 1 as the polyolefin resin.

By compressing the adhesive layer and the foam layer and irradiating the layers with electron beam having a dose of 60 kGy, a foam tape having a density of about 0.5 $g/cm^3$ in which the adhesive layer, the foam layer, and the adhesive layer were sequentially provided was prepared.

[Example 3]—Preparation of Foam Tape

A foam layer in the form of a film was formed in the same manner as in Example 1, except that during the preparation of a foam composition, the silane-modified polyolefin according to Preparation Example 2 was used instead of the silane-modified polyolefin according to Preparation Example 1.

An adhesive layer in the form of a film was formed in the same manner as in Example 1, except that during the preparation of an adhesive composition, the silane-modified polyolefin according to Preparation Example 2 was used instead of the polyolefin elastomer used in Preparation Example 1 as the polyolefin resin.

By compressing the adhesive layer and the foam layer and irradiating the layers with electron beam having a dose of 60 kGy, a foam tape having a density of about 0.5 $g/cm^3$ in which the adhesive layer, the foam layer, and the adhesive layer were sequentially provided was prepared.

[Example 4]—Preparation of Foam Tape

A foam layer in the form of a film was formed in the same manner as in Example 1, except that during the preparation of a foam composition, the polyolefin elastomer used in Preparation Example 1 was used instead of the silane-modified polyolefin according to Preparation Example 1.

An adhesive layer in the form of a film was formed in the same manner as in Example 1, except that during the preparation of an adhesive composition, the silane-modified polyolefin according to Preparation Example 1 was used instead of the polyolefin elastomer used in Preparation Example 1 as the polyolefin resin.

By compressing the adhesive layer and the foam layer and irradiating the layers with electron beam having a dose of 60 kGy, a foam tape having a density of about 0.5 g/cm$^3$ in which the adhesive layer, the foam layer, and the adhesive layer were sequentially provided was prepared.

[Comparative Example 1]—Preparation of Foam Tape

A foam layer in the form of a film and an adhesive layer in the form of a film were formed in the same manner as in Example 1, except that during the preparation of a foam composition, styrene-isoprene-styrene rubber (vector 4111, manufactured by TRSC/Dexco) was used instead of the silane-modified polyolefin according to Preparation Example 1.

By compressing the adhesive layer and the foam layer and irradiating the layers with electron beam having a dose of 60 kGy, a foam tape having a density of about 0.5 g/cm$^3$ in which the adhesive layer, the foam layer, and the adhesive layer were sequentially provided was prepared.

[Comparative Example 2]—Preparation of Foam Tape

A foam layer in the form of a film was formed in the same manner as in Example 1, except that during the preparation of a foam composition, the silane-modified polyolefin according to Preparation Example 3 was used instead of the silane-modified polyolefin according to Preparation Example 1.

An adhesive layer in the form of a film was formed in the same manner as in Example 1, except that during the preparation of an adhesive composition, the silane-modified polyolefin according to Preparation Example 3 was used instead of the polyolefin elastomer used in Preparation Example 1 as the polyolefin resin.

By compressing the adhesive layer and the foam layer and irradiating the layers with electron beam having a dose of 60 kGy, a foam tape having a density of about 0.5 g/cm$^3$ in which the adhesive layer, the foam layer, and the adhesive layer were sequentially provided was prepared.

Measurement of Crosslinking Degree

The crosslinking degrees of the foam tapes according to Examples 1 to 4 and Comparative Examples 1 and 2 were measured by a method such as the following Equation 1.

$$\text{Crosslinking degree (wt \%)} = (C-B)/A \times 100 \quad \text{Equation 1}$$

In Equation 1,

A is a weight of each of the foam tape samples according to Examples 1 to 4 and Comparative Examples 1 and 2, which are cut into a size of 5 cm×5 cm, and is measured as a difference between the weight of a bottle formed of polyethylene material, which contains xylene solvent into which the sample is introduced and the weight of a bottle formed of polyethylene material, which contains only xylene solvent, B means a weight of iron network of #200 cut into a size of 14 cm×14 cm, and C means a weight measured after the sample is filtered with the iron network, and then the iron network where the residue of the sample is remaining is dried under a constant temperature condition of 110° C. for 2 hours.

Measurement of Peel Strength

After each of the foam tapes according to Examples 1 to 4 and Comparative Examples 1 and 2 was stacked on polyethylene terephthalate (PET) film having a thickness of 50 μm, a sample for measuring the peel strength was prepared by attaching the other surface of the stacked foam tape to stainless steel substrate with a breadth of 2.5 cm×a length of 11 cm, which was polished with a tape strip.

The sample was stored under a constant temperature and constant humidity condition of 25° C. and 50 RH % for 24 hours. Moreover, the peel strength of the sample was measured at a peel rate of 300 mm/min and a peel angle of 90° under a constant temperature and constant humidity condition of 25° C. and 50 RH % by using Instron measuring machine.

Measurement of Tensile Strength and Break Elongation

A sample was prepared as a sample for measuring tensile strength and break elongation by cutting each of the foam tapes according to Examples 1 to 4 and Comparative Examples 1 and 2 into a dog-bone shape with a width of 0.635 mm in the middle portion thereof.

After the ends of the sample were fixed in Instron measuring machine, the sample was pulled at a tensile rate of 300 mm/min to measure the strength when the sample was broken as a tensile strength and the break elongation (%) through the length stretched when the sample was broken.

The results of evaluating physical properties according to Examples 1 to 4 and Comparative Examples 1 and 2 are shown in the following Table 1.

TABLE 1

| Classification | Crosslinking degree (wt %) | 180° Peel strength (N/2.5 cm) | Tensile strength (MPa) | Break elongation (%) |
|---|---|---|---|---|
| Example 1 | 70 | 87 | 8.0 | 920 |
| Example 2 | 94 | 95 | 8.5 | 900 |
| Example 3 | 92 | 93 | 8.5 | 800 |
| Example 4 | 87 | 84 | 8.3 | 880 |
| Comparative Example 1 | 90 | 68 | 5.0 | 500 |
| Comparative Example 2 | 88 | 33 | 4.5 | 300 |

According to Table 1, it could be confirmed that the foam tapes in Examples 1 to 4 had crosslinking degrees sufficient enough to implement impact resistance. Further, it could be confirmed that the foam tapes in Examples 1 to had excellent adhesive properties, specifically, high peel strength, tensile strength, and break elongation.

In contrast, it could be confirmed that in the case of the foam tape in Comparative Example 1, which included a foam layer prepared by using a foam composition including styrene-based rubber without including olefin resin, there was no big difference with the Examples in terms of crosslinking degree, but the peel strength, tensile strength, and break elongation were much less than those in the Examples. Furthermore, it could be confirmed that even in the case of the foam tape in Comparative Example 2, which included a foam layer prepared by using a foam composition including silane-modified polyolefin prepared by using linear polyethylene having a density of 0.93 g/cm$^3$, a glass transition temperature of about −25° C., and a melting point of about 130° C., there was no big difference with the Examples in terms of a crosslinking degree, but the peel strength, tensile strength, and break elongation were much less than those in the Examples.

Therefore, it can be seen that the foam composition according to the present invention may include polyolefin resin in which the density, the glass transition temperature, and the melting point were adjusted, thereby implementing a foam tape having excellent adhesive properties while implementing weight reduction characteristics.

The invention claimed is:

1. A foam tape comprising a foam layer and an adhesive layer provided on at least one surface of the foam layer,
wherein the foam layer comprises a cured product of a foam composition comprising:
a first olefin resin having a density of 0.7 g/cm$^3$ or more and 0.9 g/cm$^3$ or less, a glass transition temperature of −30° C. or less, and a melting point of 50° C. or more and 125° C. or less; and
a hollow microsphere,
wherein the adhesive layer comprises a cured product of an adhesive composition comprising:
an acrylic copolymer; and
a second olefin resin comprising at least one of a non-modified polyolefin or a silane-modified polyolefin.

2. The foam tape of claim 1, wherein the first olefin resin further comprises at least one of a non-modified polyolefin or a silane-modified polyolefin.

3. The foam tape of claim 2, wherein the silane-modified polyolefin of the first and/or second olefin resin is obtained by graft-polymerizing the non-modified polyolefin and a polymerization unit derived from an unsaturated silane compound.

4. The foam tape of claim 2, wherein the non-modified polyolefin of the first and/or second olefin resin comprises at least one of ultra-low density polyethylene, low density polyethylene, linear low density polyethylene, metallocene polyethylene, olefin block copolymer, or polyolefin-based elastomer.

5. The foam tape of claim 3, wherein the unsaturated silane compound of the first and/or second olefin resin comprises at least one of vinyltrimethoxy silane, vinyltriethoxy silane, vinyltripropoxy silane, vinyltriisopropoxy silane, vinyltributoxy silane, vinyltripentoxy silane, vinyltriphenoxy silane, or vinyltriacetoxy silane.

6. The foam tape of claim 1, wherein a content of the hollow microsphere is 1 part by weight or more and 10 parts by weight or less with respect to 100 parts by weight of the first olefin resin.

7. The foam tape of claim 1, wherein a content of the second olefin resin is 10 parts by weight or more and 60 parts by weight or less with respect to 100 parts by weight of the acrylic copolymer.

8. The foam tape of claim 1, wherein the adhesive composition further comprises a tackifier.

9. The foam tape of claim 8, wherein a content of the tackifier is 5 parts by weight or more and 40 parts by weight or less with respect to 100 parts by weight of a total weight of the acrylic copolymer and the second olefin resin.

10. The foam tape of claim 1, wherein a thickness ratio of the adhesive layer to the foam layer is 1:1 to 1:10.

11. The foam tape of claim 1, wherein the foam layer has a thickness of 0.2 mm or more and 5 mm or less.

12. The foam tape of claim 1, wherein the glass transition temperature of the first and/or second olefin resin is from −100° C. to −30° C.

13. The foam tape of claim 2, wherein the first olefin resin is the same as the second olefin resin.

* * * * *